(12) United States Patent
Dodoc

(10) Patent No.: US 9,128,272 B2
(45) Date of Patent: Sep. 8, 2015

(54) OPTICAL SYSTEM FOR IMAGING AN OBJECT

(71) Applicant: Carl Zeiss AG, Oberkochen (DE)

(72) Inventor: Aurelian Dodoc, Heidenheim (DE)

(73) Assignee: Carl Zeiss AG, Oberkochen (DE)

(*) Notice: Subject to any disclaimer, the term of this patent is extended or adjusted under 35 U.S.C. 154(b) by 58 days.

(21) Appl. No.: 13/964,211

(22) Filed: Aug. 12, 2013

(65) Prior Publication Data

US 2014/0043693 A1 Feb. 13, 2014

Related U.S. Application Data

(60) Provisional application No. 61/681,768, filed on Aug. 10, 2012.

(30) Foreign Application Priority Data

Aug. 10, 2012 (DE) .......................... 10 2012 214 303

(51) Int. Cl.
*G02B 15/14* (2006.01)
*G02B 13/18* (2006.01)
*G02B 13/04* (2006.01)
*G02B 15/177* (2006.01)
(Continued)

(52) U.S. Cl.
CPC .............. *G02B 15/14* (2013.01); *G02B 15/177* (2013.01); *G02B 5/005* (2013.01); *G02B 9/60* (2013.01); *G02B 13/002* (2013.01); *G02B 13/006* (2013.01); *G02B 13/009* (2013.01); *G02B 13/0015* (2013.01); *G02B 13/0045* (2013.01); *G02B 13/04* (2013.01); *G02B 13/18* (2013.01); *G02B 15/20* (2013.01); *G02B 15/22* (2013.01)

(58) Field of Classification Search
CPC ........ G02B 9/60; G02B 13/009; G02B 13/04; G02B 15/177; G02B 15/20; G02B 15/14; G02B 13/0015; G02B 13/002; G02B 13/006; G02B 15/22; G02B 5/005
USPC ......... 359/680, 682–686, 713–715, 740, 752, 359/753, 781, 783
See application file for complete search history.

(56) References Cited

U.S. PATENT DOCUMENTS 3,682,534 A 8/1972 Cook et al.
3,705,759 A * 12/1972 Cook et al. .................... 359/683
(Continued)

FOREIGN PATENT DOCUMENTS

DE 24 08 871 A 8/1974
DE 27 22 843 A1 12/1977
(Continued)

*Primary Examiner* — Evelyn A Lester
(74) *Attorney, Agent, or Firm* — Muirhead & Saturnelli, LLC

(57) ABSTRACT

An optical system for imaging an object on an image acquisition unit. The optical system, from the object, comprises a first lens unit, a second lens unit, a third lens unit and a fourth lens unit in the direction of the image acquisition unit. The first lens unit comprises at least one lens group with negative refractive power. The second lens unit comprises at least one lens group with positive refractive power and the third lens unit comprises at least one lens group with negative refractive power. The second lens unit and the third lens unit overall comprise at least three lens groups. From the first lens unit in the direction of an image acquisition unit, the first lens group, the second lens group and then the third lens group are arranged. The three lens groups have a movable design for adjusting the focal length of the optical system.

27 Claims, 2 Drawing Sheets

(51) Int. Cl.
  *G02B 13/00*    (2006.01)
  *G02B 9/60*     (2006.01)
  *G02B 5/00*     (2006.01)
  *G02B 15/22*    (2006.01)
  *G02B 15/20*    (2006.01)

(56) References Cited

U.S. PATENT DOCUMENTS

| | | |
|---|---|---|
| 3,918,797 A | 11/1975 | Takano |
| 4,198,126 A | 4/1980 | Abe et al. |
| 4,318,593 A | 3/1982 | Tsuji et al. |
| 4,730,908 A | 3/1988 | Tanaka |
| 5,416,639 A | 5/1995 | Yamanashi |
| 5,572,365 A | 11/1996 | Ito |
| 5,838,500 A | 11/1998 | Ito et al. |
| 5,847,875 A | 12/1998 | Kodama et al. |
| 6,163,410 A | 12/2000 | Nagaoka |
| 6,222,680 B1 | 4/2001 | Yamamoto et al. |
| 6,636,361 B2 | 10/2003 | Wada |
| 2003/0165019 A1 | 9/2003 | Yamamoto |
| 2004/0080632 A1 | 4/2004 | Iwasawa et al. |
| 2006/0238887 A1 | 10/2006 | Moskovich et al. |
| 2008/0204893 A1 | 8/2008 | Jeong et al. |
| 2012/0050602 A1 | 3/2012 | Imaoka et al. |

FOREIGN PATENT DOCUMENTS

| | | |
|---|---|---|
| DE | 29 46 413 A1 | 5/1980 |
| DE | 44 29 247 A1 | 2/1995 |
| EP | 2 000 839 A1 | 12/2008 |
| EP | 2 085 804 A1 | 8/2009 |
| JP | H05 19169 A | 1/1993 |
| JP | H07063990 A | 3/1995 |
| JP | H08005921 A | 1/1996 |

* cited by examiner

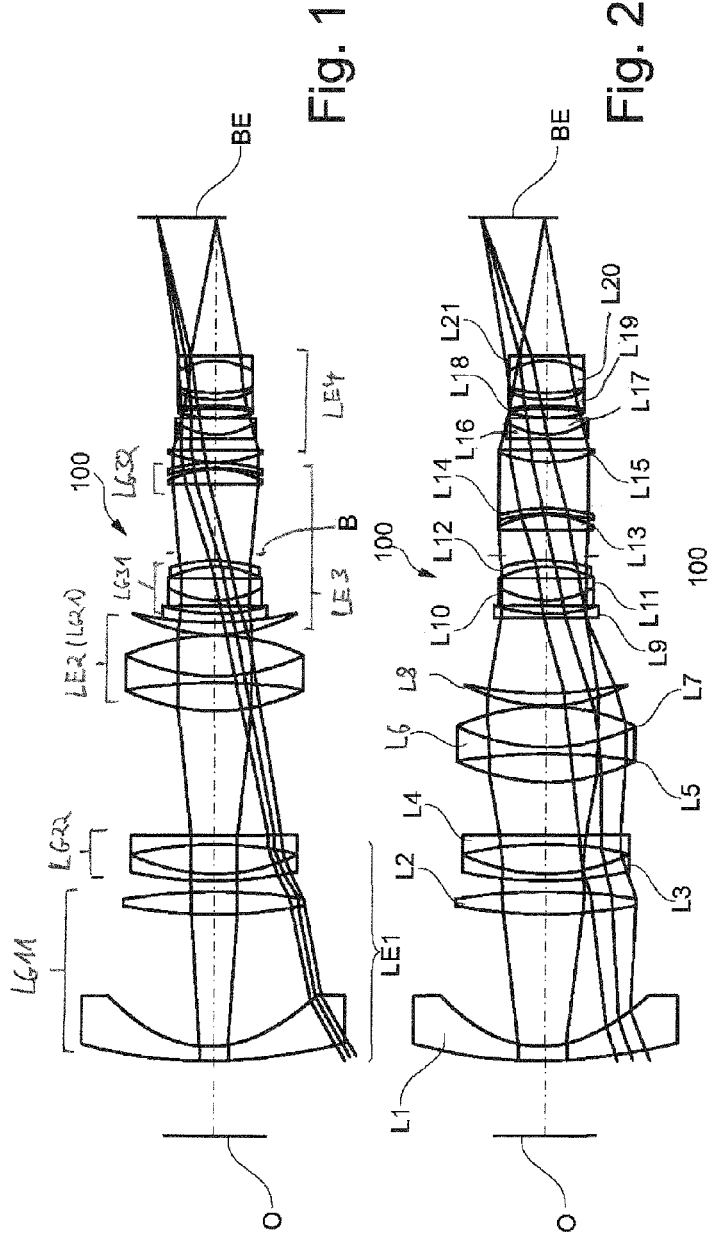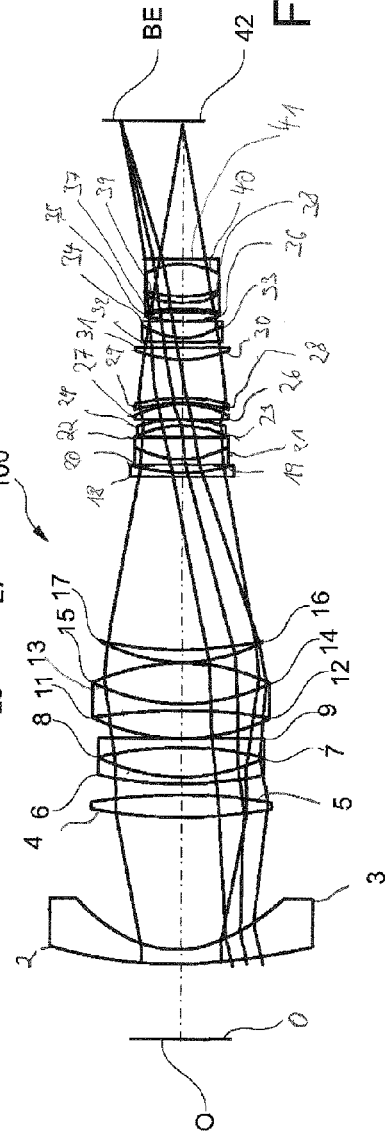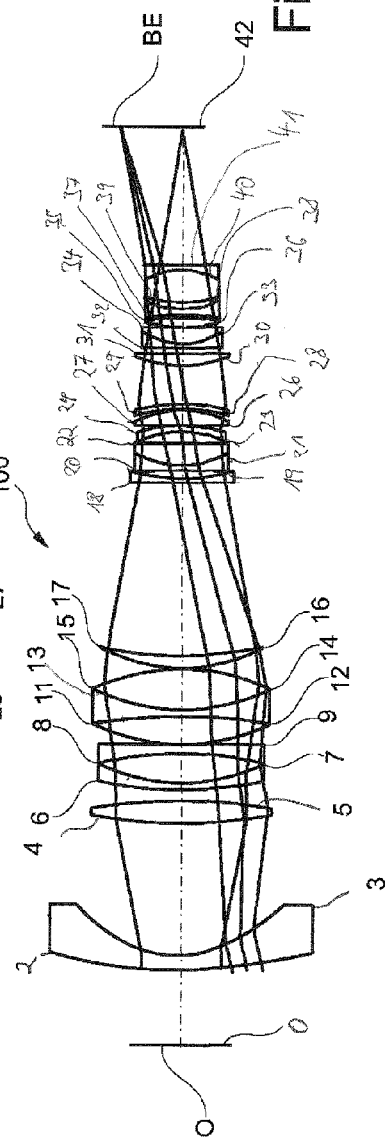

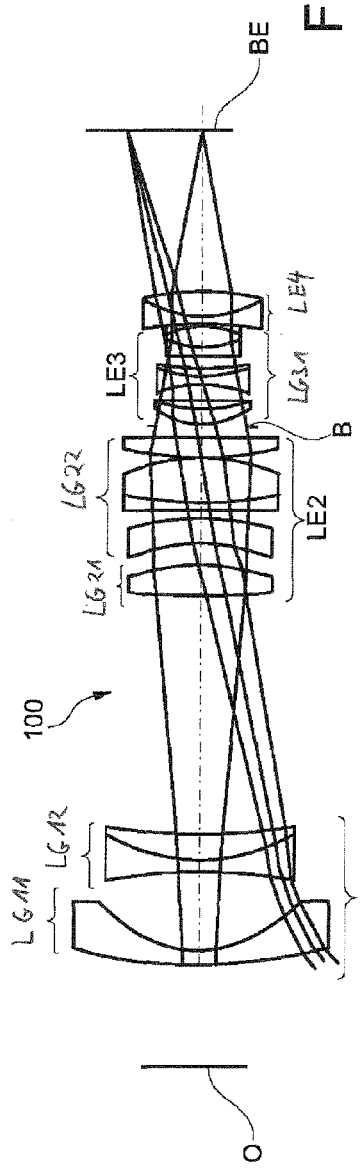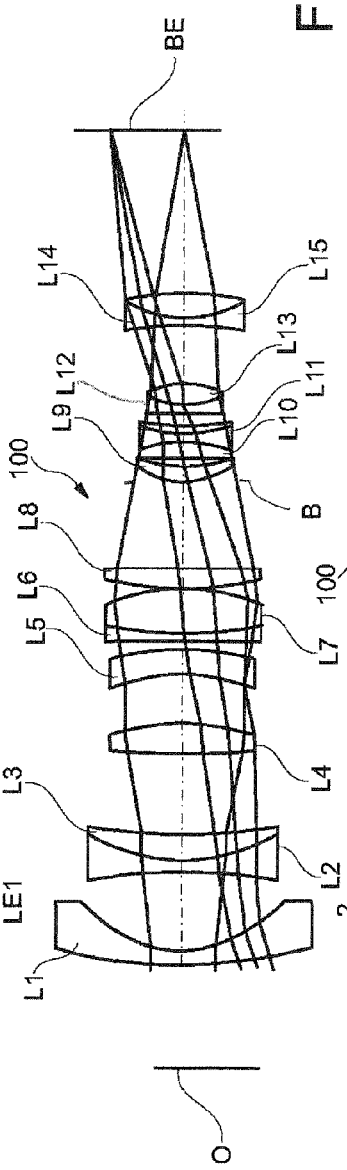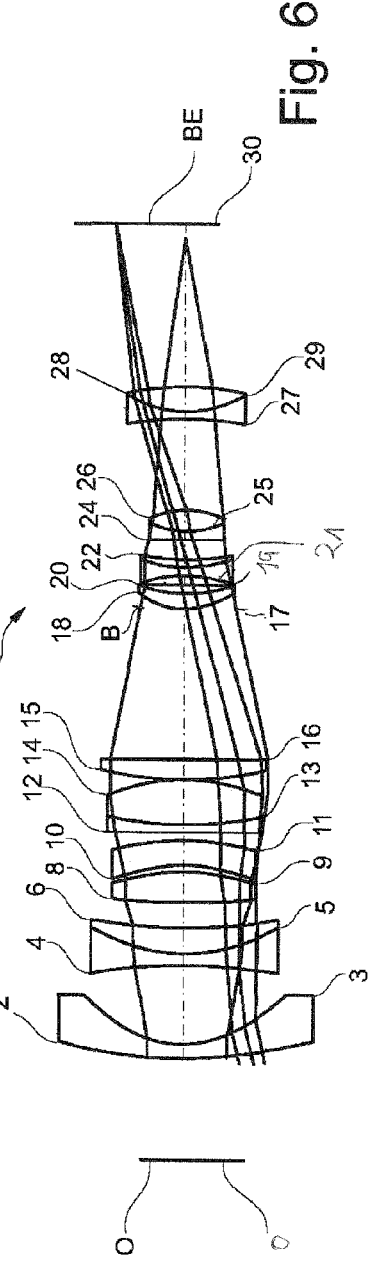

OPTICAL SYSTEM FOR IMAGING AN OBJECT

TECHNICAL FIELD

This application relates to an optical system for imaging an object on an image acquisition unit. By way of example, the optical system is embodied as an objective.

BACKGROUND OF THE INVENTION

The prior art has disclosed the practice of using a wide-angle objective with a small focal length (e.g. a focal length of approximately 30 mm) when imaging an object with large angular fields (e.g. with an angular range of greater than 70°). Said wide-angle objective generally comprises a first lens unit with negative refractive power and a second lens unit with positive refractive power. For imaging an object with small angular fields (e.g. with an angular range of less than 25°), use is generally made of a tele-objective with a large focal length (e.g. a focal length of approximately 100 mm).

Furthermore, the prior art has disclosed zoom-objectives, which have a focal-length range extending from a wide-angle range into a tele-range. The focal length of these zoom-objectives can be set. By way of example, U.S. Pat. No. 5,847,875, which is incorporated herein by reference, has disclosed a zoom-lens system. The known zoom-lens system comprises a first lens unit consisting of a lens group with negative refractive power, a second lens unit consisting of a first lens group and a second lens group, wherein both lens groups have positive refractive power, a third lens unit consisting of a lens group with negative refractive power and a fourth lens unit consisting of a lens group with positive refractive power. Furthermore, a stop is arranged between the second lens unit and the third lens unit. All lens groups within the four aforementioned lens units can be displaced along an optical axis in order to adjust the focal length. The position of the first lens group of the second lens unit can additionally be set for focusing purposes. The image plane of the zoom-lens system is not stable during the zoom procedure. Refocusing is necessary for this reason.

JP 08005921 A, which is incorporated herein by reference, has likewise disclosed a zoom-lens system. The zoom-lens system known from this document comprises a first lens unit consisting of a lens group with negative refractive power, a second lens unit consisting of a lens group with positive refractive power, a third lens unit consisting of a lens group with negative refractive power, a fourth lens unit consisting of a lens group with positive refractive power and a fifth lens unit consisting of a lens group with positive refractive power. A stop is arranged between the second lens unit and the third lens unit. In order to adjust the focal length of the zoom-lens system, the lens groups within the second lens unit, the third lens unit and the fourth lens unit are moved. By contrast, the first lens unit and the fifth lens unit have a fixed position when adjusting the focal length. They are not moved when adjusting the focal length.

U.S. Pat. No. 3,682,534, which is incorporated herein by reference, has disclosed a zoom-objective which consists of several lens units. The known zoom-objective comprises a first lens unit consisting of a first lens group with negative refractive power and a second lens group with negative refractive power, a second lens unit consisting of a lens group with positive refractive power, a third lens unit consisting of a lens group with negative refractive power, a fourth lens unit consisting of a lens group with positive refractive power and a fifth lens unit consisting of a lens group with positive refractive power. A stop is arranged between the fourth lens unit and the fifth lens unit. In order to adjust the focal length, the lens groups within the second lens unit, the third lens unit and the fourth lens unit are displaced along the optical axis of the zoom-objective in such a way that the lens group of the second lens unit and the lens group of the fourth lens unit carry out a common, mechanically coupled movement. The first lens unit and the fifth lens unit are fixed when adjusting the focal length. Accordingly, they are not moved when adjusting the focal length. Focusing onto an object to be imaged is achieved by moving the second lens group of the first lens unit.

Accordingly, it would be desirable to specify an optical system (for example an objective for a wide-angle range of greater than 70°), which has an improved design and improved imaging properties. In particular, the image plane should be stabilized.

SUMMARY OF THE INVENTION

An optical system according to the system described herein, more particularly an objective, is designed for imaging an object onto an image acquisition unit. The optical system has an adjustable focal length. Furthermore, as seen in the direction of an image acquisition unit, from an object, the optical system comprises at least a first lens unit, at least a second lens unit, at least a third lens unit and at least a fourth lens unit. Hence, from an object, the optical system according to the system described herein has the following sequence of units, as seen in the direction of an image acquisition unit: first lens unit-second lens unit-third lens unit-fourth lens unit. In one exemplary embodiment of the system described herein, the optical system only comprises precisely the aforementioned lens units. In an alternative embodiment, provision is made for the optical system according to the system described herein to have more than the aforementioned lens units.

Here, both above and below, a lens unit is understood to be a unit with an individual lens group or with several lens groups, wherein each lens group can consist of an individual lens or of several lenses. The lenses can have different refractive powers. The lens groups of the aforementioned lens units can have different functions. As will still be explained in more detail below, some of the lens groups have a movable design for adjusting the focal length of the optical system. Other lens groups in turn have a movable design for focusing onto an object to be imaged.

In the optical system according to the system described herein, provision is now made for the second lens unit and the third lens unit overall to comprise at least three lens groups, namely a first lens group, a second lens group and a third lens group, wherein, from the first lens unit in the direction of an image acquisition unit, the first lens group is arranged first, followed by the second lens group and then the third lens group. Hence, as seen in the direction of an image acquisition unit from the first lens unit, the optical system according to the system described herein comprises the following sequence of groups: first lens group-second lens group-third lens group. By way of example, provision is made for only precisely three lens groups to be present overall in the second lens unit and the third lens unit. Furthermore, in the optical system according to the system described herein, provision is made for the aforementioned three lens groups to have a movable design for adjusting the focal length of the optical system. At least one lens group from the set containing the first lens group, the second lens group and the third lens group has positive refractive power. Moreover, at least one lens group from the set containing the first lens group, the second lens group and the third lens group has negative refractive power. Here, it is obvious to a person skilled in the art that an individual lens group has either only positive refractive power or only negative refractive power.

In the optical system according to the system described herein, the first lens group, the second lens group and the third lens group of the second lens unit and the third lens unit are moved along the optical axis of the optical system during a zoom procedure (i.e. during a procedure for adjusting the focal length). By contrast, the first lens unit and the fourth lens unit are not moved during the zoom procedure. They are fixedly arranged on the optical axis during the zoom procedure.

The prior art has disclosed the practice of moving a lens group within a second lens unit for varying a focal length of an optical system. A lens group within a third lens unit is moved for compensating the position of the image plane. The image plane remains in a fixed position during the zoom procedure. However, the aberrations of the image change with the focal length. For varying the aberrations, it is now advantageous if a further lens group within the second lens unit or the third lens unit is moved during the zoom procedure, as is now provided for in the system described herein.

In the optical system according to the system described herein, provision is additionally or alternatively made for the second lens unit to comprise at least one lens group with positive refractive power (e.g. the first lens group, the second lens group and/or the third lens group) and/or for the second lens unit to comprise at least one lens group with negative refractive power (e.g. the first lens group, the second lens group and/or the third lens group).

In a further embodiment of the optical system according to the system described herein, provision is made, additionally or as an alternative thereto, for the second lens unit to comprise the first lens group and the second lens group and for the third lens unit to comprise the third lens group. As an alternative thereto, provision is made in a further exemplary embodiment of the system described herein for the second lens unit to comprise the first lens group and for the third lens unit to comprise the second lens group and the third lens group.

In an embodiment of the optical system according to the system described herein, provision is made, additionally or as an alternative thereto, for the first lens unit of the optical system or a lens group of the first lens unit to have negative refractive power. In a further embodiment of the optical system according to the system described herein, provision is additionally or alternatively made for the fourth lens unit of the optical system or a lens group of the fourth lens unit to have negative or positive refractive power.

In an embodiment of the optical system according to the system described herein, provision is made, additionally or as an alternative thereto, for the second lens unit to have a linear magnification which can be adjusted between −0.4 and −2 when adjusting the focal length. In an in turn further embodiment of the optical system according to the system described herein, provision is made, additionally or as an alternative thereto, for the third lens unit to have a positive linear magnification which can be adjusted between 1.5 and 3 when adjusting the focal length.

In an embodiment of the optical system according to the system described herein, provision is made, additionally or as an alternative thereto, for the second lens unit to comprise the first lens group and the second lens group and for the first lens group and the second lens group to have positive refractive power. In an in turn further embodiment of the optical system according to the system described herein, provision is made as an alternative thereto for the first lens group of the second lens unit to have positive refractive power or the second lens group of the second lens unit to have positive refractive power. In particular, in a further exemplary embodiment of the system according to the system described herein, provision is additionally or alternatively made for the first lens group of the second lens unit to be formed by a single lens.

In a further embodiment of the optical system according to the system described herein, provision is made, additionally or as an alternative thereto, for the third lens unit to comprise the third lens group. However, reference is explicitly made to the fact that, in one exemplary embodiment, the second lens unit comprises a lens group from the set containing the first lens group, the second lens group and the third lens group (e.g. the first lens group) and that the third lens unit comprises two lens groups from the set containing the first lens group, the second lens group and the third lens group (e.g. the second lens group and the third lens group).

In an embodiment of the optical system according to the system described herein, provision is additionally or alternatively made for the first lens group to have a linear magnification and for the second lens group to have a linear magnification. The linear magnification of the first lens group and the linear magnification of the second lens group change sign at the same time when adjusting the focal length.

In an embodiment of the optical system according to the system described herein, provision is made, additionally or as an alternative thereto, for the first lens unit to comprise at least two lens groups. From an object, the fourth lens group is arranged first, followed by the fifth lens group, as seen in the direction of an image acquisition unit. Both the fourth lens group and the fifth lens group have negative refractive power.

Neither the fourth lens group nor the fifth lens group is moved for setting a focal length of the optical system. By contrast, the fifth lens group is moved for focusing the optical system. Hence, the fifth lens group has a movable design for focusing the optical system.

In a further embodiment of the optical system according to the system described herein, provision is made, additionally or as an alternative thereto, for the first lens group and the second lens group respectively to have a linear magnification which changes the sign when changing the focal length of the optical system such that the linear magnification of the first lens unit keeps the same sign.

In an embodiment of the optical system according to the system described herein, provision is made, additionally or as an alternative thereto, for both the absolute value of the linear magnification of the second lens unit and the absolute value of the linear magnification of the third lens unit to increase continuously when adjusting the focal length of the optical system from the first focal length setting to the second focal length setting.

In a further embodiment of the optical system according to the system described herein, provision is made, additionally or as an alternative thereto, for the product of the linear magnification of the second lens unit and the linear magnification of the third lens unit in terms of absolute value to lie in the range of 0.9 to 5.0.

In an in turn further embodiment of the optical system according to the system described herein, provision is made, additionally or as an alternative thereto, for the second lens unit to have a (second) linear magnification $\beta_2$. Furthermore, the third lens unit has a (third) linear magnification $\beta_3$. In the case of the optical system according to the system described herein, provision is now made for both the absolute value of the (second) linear magnification $\beta_2$ and also the absolute value of the (third) linear magnification $\beta_3$ in a first focal length setting of the second lens unit and the third lens unit, which can be set in order to achieve a first focal length of the optical system, to be smaller than the absolute value of the (second) linear magnification $\beta_2$ and the absolute value of the (third) linear magnification $\beta_3$ in a second focal length setting of the second lens unit and the third lens unit, which can be set in order to achieve a second focal length of the optical system. In other words, the absolute values of the linear magnification of the second lens unit and of the linear magnification of the third lens unit are smaller in the first focal length setting than in the second focal length setting. By way of example, the first focal length setting is a wide-angle setting of the optical system. By contrast, the second focal length setting is, for example, a tele-setting of the optical system.

For the variation of the aberrations, it is advantageous if both the second lens unit and the third lens unit provide an active contribution to varying the focal length. This is ensured by virtue of the fact that the absolute values of the linear magnification of the second lens unit and of the linear magnification of the third lens unit are smaller in the first focal length setting than in the second focal length setting.

As already mentioned above, provision is alternatively or additionally made in an embodiment of the optical system according to the system described herein for both the absolute value of the (second) linear magnification $\beta_2$ of the second lens unit and the absolute value of the (third) linear magnification $\beta_3$ of the third lens unit to increase continuously when adjusting the focal length of the optical system from the first focal length setting to the second focal length setting. By way of example, provision is made for the optical system to have the following feature: a product of the (second) linear magnification $\beta_2$ and the (third) linear magnification $\beta_3$ in terms of absolute value lies in the range from 1.41 to 4.21. The aforementioned limits of the range belong to the claimed range. However, reference is explicitly made to the fact that the system described herein is not restricted to the aforementioned range. Rather, any range that is suitable for the system described herein can be used.

In a further exemplary embodiment of the optical system according to the system described herein, provision is additionally made for the optical system to satisfy the following condition:

$$|\beta_{2W}\beta_{3W}|\%<|\beta_{2M}\beta_{3M}|<|\beta_{2T}\beta_{3T}| \quad \text{[Relation 1]}$$

wherein $\beta_{2W}$ is the linear magnification of the second lens unit in the first focal length setting, $\beta_{3W}$ is the linear magnification of the third lens unit in the first focal length setting, $\beta_{2M}$ is the linear magnification of the second lens unit in the second focal length setting, $\beta_{3M}$ is the linear magnification of the third lens unit in the second focal length setting, $\beta_{2T}$ is the linear magnification of the second lens unit in a third focal length setting and $\beta_{3T}$ is the linear magnification of the third lens unit in the third focal length setting.

By way of example, the product of the (second) linear magnification $\beta_2$ and the (third) linear magnification $\beta_3$ changes continuously in the range from 0.98 to 2.64, wherein the specified limits of the range belong to the range. However, reference is explicitly made to the fact that the system described herein is not restricted to the aforementioned range. Rather, any range that is suitable for the system described herein can be used.

In a further embodiment of the optical system according to the system described herein, provision is additionally or alternatively made for a stop to be arranged between the second lens unit and the third lens unit. By way of example, provision is furthermore made for the stop to be arranged within the third lens unit. When adjusting the focal length of the optical system, the stop is moved together with the third lens unit or within the third lens unit. That is to say, the stop moves simultaneously with the third lens unit. In other words, the stop has a movable design together with the third lens unit in order to adjust the focal length of the optical system. By way of example, provision is furthermore made for the stop to have an aperture. The aperture of the stop can be set when adjusting the focal length of the optical system. In particular, provision is made for an extent of the aperture to lie in the range from 20 mm to 35 mm.

In an in turn further exemplary embodiment of the optical system according to the system described herein, provision is additionally or alternatively made for a lens in the first lens unit or a lens of the first lens unit to have at least one first aspherical surface. Additionally, or as an alternative thereto, provision is made for a lens in the second lens unit or a lens of the second lens unit to have at least one second aspherical surface. In turn, provision is made, additionally or as an alternative thereto, for the third lens unit to have at least one third aspherical surface. Examples for the design of the first aspherical surface, the second aspherical surface and the third aspherical surface are specified below.

In an in turn further exemplary embodiment of the optical system according to the system described herein, provision is additionally or alternatively made for the positive refractive power within the second lens unit or in the second lens unit to refer to a focal length which lies in the range between 40 mm and 70 mm and/or for the negative refractive power within the third lens unit or in the third lens unit to refer to a focal length which lies in the range between −40 mm and −120 mm.

In a further exemplary embodiment of the optical system according to the system described herein, provision is additionally or alternatively made for the first lens unit to comprise at least one lens with positive refractive power. By way of example, it can be designed as a single lens or as a cemented element consisting of a lens with positive refractive power and a lens with negative refractive power.

As already mentioned above, the optical system is for example embodied as an objective. The system described herein also relates to a recording unit for imaging an object, with at least one optical system and at least one image acquisition unit. The optical system comprises one of the aforementioned features or one of the features yet to be mentioned below. Furthermore, the optical system can comprise a combination of at least two of the features mentioned above or below.

BRIEF DESCRIPTION OF THE DRAWINGS

Embodiments of the system described herein will be explained in more detail below on the basis of the figures, which are briefly described as follows:

FIG. 1 shows a first sectional view of a first exemplary embodiment of an objective in a first focal length setting;

FIG. 2 shows a second sectional view of the objective according to FIG. 1 in a second focal length setting;

FIG. 3 shows a third sectional view of the objective according to FIG. 1 in a third focal length setting;

FIG. 4 shows a first sectional view of a second exemplary embodiment of an objective in a first focal length setting;

FIG. 5 shows a second sectional view of the objective according to FIG. 4 in a second focal length setting; and FIG. 6 shows a third sectional view of the objective according to FIG. 4 in a third focal length setting.

DETAILED DESCRIPTION OF VARIOUS EMBODIMENTS

FIGS. 1 to 3 show sectional views of an optical system in the form of an objective 100. FIG. 1 is a sectional view of the objective 100 in a first focal length setting, namely a wide-angle setting. FIG. 3 is a sectional view of the objective 100 in a third focal length setting, namely a tele-setting. FIG. 2 shows a sectional view of the objective 100 in a second (middle) focal length setting, which lies between the first focal length setting and the third focal length setting.

The objective 100 serves to image an object O (only illustrated schematically) on an image acquisition unit BE or in an image plane. It comprises a first lens unit LE1, a second lens unit LE2, a third lens unit LE3 and a fourth lens unit LE4. In the direction of the image acquisition unit BE from the object O, the aforementioned lens units LE1 to LE4 are arranged in the objective 100 in the following sequence: first lens unit LE1-second lens unit LE2-third lens unit LE3-fourth lens unit LE4. In respect of the definition of the term lens unit, reference is made to the text above.

The first lens unit LE1 comprises a first lens L1, a second lens L2, a third lens L3 and a fourth lens L4. The first lens L1 and the second lens L2 form a fourth lens group LG11, which has negative refractive power. Furthermore, the third lens L3 and the fourth lens L4 form a fifth lens group LG22, which likewise has negative refractive power.

The second lens unit LE2 is likewise composed of several lenses, namely a fifth lens L5, a sixth lens L6, a seventh lens L7 and an eighth lens L8. The aforementioned lenses L5 to L8 form the first lens group LG21, which has positive refractive power.

The third lens unit LE3 comprises a ninth lens L9, a tenth lens L10, an eleventh lens L11, a twelfth lens L12, a thirteenth lens L13 and a fourteenth lens L14. The aforementioned lenses L9 to L14 are subdivided into two lens groups. In other words, the third lens unit LE3 consists of two lens groups, namely a second lens group LG31 and a third lens group LG32. The ninth lens L9, the tenth lens L10, the eleventh lens L11 and the twelfth lens L12 form the second lens group LG31, which has negative refractive power. By contrast, the thirteenth lens L13 and the fourteenth lens L14 form the third lens group LG32, which has positive refractive power.

The fourth lens unit LE4 likewise has several lenses, namely a fifteenth lens L15, a sixteenth lens L16, a seventeenth lens L17, an eighteenth lens L18, a nineteenth lens L19, a twentieth lens L20 and a twenty-first lens L21. The aforementioned lenses L15 to L21 are fixedly arranged on the optical axis of the objective 100. Accordingly, they have an unmovable design. The fourth lens unit LE4 furthermore has positive refractive power.

Each of the aforementioned lenses L1 to L21 has a first surface directed at the object O and a second surface directed at the image acquisition unit BE. These are characterized in FIG. 3.

Thus, the first lens L1 has a surface 2 directed at the object O and a surface 3 directed at the image acquisition unit BE. The second lens L2 is provided with a surface 4 directed at the object O and with a surface 5 directed at the image acquisition unit BE. The third lens L3 has a surface 6 directed at the object O and a surface 7 directed at the image acquisition unit BE. By contrast, the fourth lens L4 is provided with a surface 8 directed at the object O and with a surface 9 directed at the image acquisition unit BE. The fifth lens L5 has a surface 11 directed at the object O and a surface 12 directed at the image acquisition unit BE. The sixth lens L6 likewise has the surface 12 directed at the object O and a surface 13 directed at the image acquisition unit BE. The seventh lens L7 has a surface 14 directed at the object O and a surface 15 directed at the image acquisition unit BE. By contrast, the eighth lens L8 has a surface 16 directed at the object O and a surface 17 directed at the image acquisition unit BE.

The ninth lens L9 has a surface 18 directed at the object O and a surface 19 directed at the image acquisition unit BE. By contrast, the tenth lens L10 has a surface 20 directed at the object O and a surface 21 directed at the image acquisition unit BE. The eleventh lens L11 in turn has the surface 21 directed at the object O and a surface 22 directed at the image acquisition unit BE. The twelfth lens L12 has a surface 23 directed at the object O and is furthermore provided with a surface 24 directed at the image acquisition unit BE.

The thirteenth lens L13 has a surface 26 directed at the object O and a surface 27 directed at the image acquisition unit BE. The fourteenth lens L14 in turn has a surface 28 directed at the object O and a surface 29 directed at the image acquisition unit BE.

The fifteenth lens L15 now has a surface 30 directed at the object O and a surface 31 directed at the image acquisition unit BE. The sixteenth lens L16 is provided with a surface 32 directed at the object O and with a surface 33 directed at the image acquisition unit BE. The seventeenth lens L17 likewise has the surface 33 (as surface directed at the object O). Furthermore, the seventeenth lens L17 has a surface 34 directed at the image acquisition unit BE.

The eighteenth lens L18 is provided with a surface 35 directed at the object O and with a surface 36 directed at the image acquisition unit BE. The nineteenth lens L19 has a surface 37 directed at the object O. Furthermore, the nineteenth lens L19 has a surface 38 directed at the image acquisition unit BE. The twentieth lens L20 is provided with a surface 39 directed at the object O and with a surface 40 directed at the image acquisition unit BE. Furthermore, the twenty-first lens L21 is provided with the surface 40 (now directed at the object O) and with a surface 41 directed at the image acquisition unit BE.

Properties of the individual lens surfaces are specified in a table below.

TABLE 1

| Surface | Radius [mm] | Thickness [mm] | Glass |
|---|---|---|---|
| 0 | Infinity | 0.000000 | |
| 1 | Infinity | 1.000000 | |
| 2 | 179.440927 | 5.000000 | SLAL14 |
| 3 (A) | 42.793891 | 45.265549 | |
| 4 | 165.537518 | 7.849603 | STIH1 |
| 5 | −178.955980 | 3.811496 | |
| 6 | 141.474076 | 2.197848 | SBSM81 |
| 7 (A) | 56.630789 | 11.108192 | |
| 8 | −118.888181 | 2.002500 | SPHM52 |
| 9 | 2717.871636 | 0.098411 | |
| 10 | 112.626934 | 45.090755 | |
| 11 | 87.991467 | 9.120389 | NPK51 |
| 12 | −240.739590 | 2.621041 | SNBH55 |
| 13 | 82.226285 | 0.094764 | |
| 14 (A) | 63.823508 | 14.387301 | SFPM2 |
| 15 | −80.756780 | 0.109966 | |
| 16 | 72.855277 | 4.550673 | SBSM81 |
| 17 | 157.489217 | 0.786296 | |
| 18 | 258.306392 | 1.997536 | NPK51 |
| 19 | 68.039292 | 3.147796 | |

TABLE 1-continued

| Surface | Radius [mm] | Thickness [mm] | Glass |
|---|---|---|---|
| 20 | −227.644895 | 2.039384 | SLAL18 |
| 21 | 31.513851 | 7.129721 | SNBH53 |
| 22 | 383.678104 | 4.363849 | |
| 23 | −34.485216 | 2.128739 | NKZFS11 |
| 24 | −56.569919 | 0.098778 | |
| 25 | Stop | 26.651291 | |
| 26 | 614.963341 | 5.300596 | SFPL53 |
| 27 | −42.422656 | 0.095794 | |
| 28 | −94.791888 | 1.997986 | SNSL36 |
| 29 | −110.928045 | 0.093590 | |
| 30 | 33.389624 | 4.678853 | SFPL51 |
| 31 | 199.000685 | 3.812433 | |
| 32 | 141.075501 | 1.997055 | NKZFS11 |
| 33 | 23.776940 | 5.387905 | NPK51 |
| 34 | 251.054608 | 0.091703 | |
| 35 | 48.976132 | 3.063885 | OSTIH11 |
| 36 | 348.376035 | 1.375109 | |
| 37 | −109.261627 | 2.658027 | SYGH51 |
| 38 | 31.970394 | 1.739882 | |
| 39 | 73.530882 | 11.462996 | OSLAL14 |
| 40 | −31.340921 | 1.998918 | STIH1 |
| 41 | −1715.506607 | 49.176950 | |
| 42 | Infinity | | |

The individual surfaces of the individual lenses L1 to L21 emerge from the table above. The radii of the individual surfaces are also specified. Moreover, the distance of the vertex of one surface to the vertex of the next surface is specified. This also reproduces the thickness of the individual lenses L1 to L21. The type of glass of the respective lenses is also specified, with the notation of the glass types relating to glass types from Schott and Ohara.

The surfaces 1 and 10 are not illustrated in FIGS. 1 to 3. These are auxiliary surfaces, which were used to calculate the aforementioned data. The surfaces 1 and 10 are not physically realized in the objective 100.

Surface 25 denotes a stop B (cf. FIG. 1). Said stop is arranged within the third lens unit LE3, namely between the second lens group LG31 and the third lens group LG32. The stop B is fixedly connected to the first lens group LG31 by a mechanical device, as will be explained in more detail below. In the case of the objectives according to the system described herein, it is advantageous that the stop B is mechanically coupled to a movable negative lens group by a mechanical device. This coupling has an advantageous effect on the diameters of the individual units and therefore leads to small diameters of the individual units.

In the table, the surface 0 denotes the object O. The surface 42 denotes the surface of the image acquisition unit BE.

Surfaces of individual lenses have an aspherical design. These surfaces are marked by an "A", with the aspherical design emerging from the following equation with the associated aspherical coefficients:

$$z = \frac{ch^2}{1 + SQRT\{1 - (1+k)c^2h^2\}} + A_4h^4 + A_6h^6 + A_8h^8 + A_{10}h^{10} + A_{12}h^{12} + A_{14}h^{14} + A_{16}h^{16} + A_{18}h^{18} + A_{20}h^{20} + A_{22}h^{22}$$

wherein z is the sag of the surface of a lens parallel to the z-axis, c is the curvature of the surface at the vertex of the lens, k is the conical constant and $A_4$ to $A_{22}$ correspond to the aspherical coefficients of fourth, sixth, eighth, tenth, twelfth, fourteenth, sixteenth, eighteenth, twentieth and twenty-second order.

For the surface 3, the following coefficients apply:
k=0.000000
$A_4$=−3.47216999554806E-07
$A_6$=1.62281323450359E-10
$A_6$=−1.10227868827696E-12
$A_{10}$=9.47999979625852E-16
$A_{12}$=−4.11693166339820E-19
For the surface 7, the following coefficients apply:
k=0.000000
$A_4$=−8.86986401525628E-07
$A_6$=7.67654111159220E-11
$A_8$=−8.00620389675939E-13
$A_{10}$=8.94019839262487E-16
$A_{12}$=−4.10451702903618E-19
For the surface 14, the following coefficients apply:
k=0.000000
$A_4$=−1.16094991801851E-06
$A_6$=2.26222305831368E-10
$A_8$=−4.22710608286331E-13
$A_{10}$=3.84564751821469E-16
$A_{12}$=−1.37909957903892E-19

The following Table 2 specifies the focal lengths, the F-number and the distance of the specified surfaces to the next surface in the focal length settings illustrated in FIGS. 1 to 3.

TABLE 2

| Zoom | f | F-number | Distance 10 [mm] | Distance 17 [mm] | Distance 25 [mm] | Distance 29 [mm] |
|---|---|---|---|---|---|---|
| FIG. 1 | 28.500 | 2.80 | 45.091 | 0.786 | 26.651 | 0.094 |
| FIG. 2 | 50.000 | 2.80 | 20.534 | 24.747 | 11.120 | 16.221 |
| FIG. 3 | 83.996 | 2.80 | 0.094 | 65.976 | 0.788 | 5.763 |

FIGS. 4 to 6 show sectional views of a further exemplary embodiment of an optical system in the form of an objective 100. FIG. 4 is a sectional view of the objective 100 in a first focal length setting, namely a wide-angle setting. FIG. 6 is a sectional view of the objective 100 in a third focal length setting, namely a tele-setting. FIG. 5 shows a sectional view of the objective 100 in a second (middle) focal length setting, which lies between the first focal length setting and the third focal length setting.

The objective 100 serves to image an object O (only illustrated schematically) on an image acquisition unit BE. It comprises a first lens unit LE1, a second lens unit LE2, a third lens unit LE3 and a fourth lens unit LE4. In the direction of the image acquisition unit BE from the object O, the aforementioned lens units LE1 to LE4 are arranged in the objective 100 in the following sequence: first lens unit LE1 -second lens unit LE2-third lens unit LE3-fourth lens unit LE4. In respect of the definition of the term lens unit, reference is made to the text above.

The first lens unit LE1 comprises a first lens L1, a second lens L2, and a third lens L3. The first lens L1 forms a fourth lens group LG11, which has negative refractive power. Furthermore, the second lens L2 and the third lens L3 form a fifth lens group LG12, which likewise has negative refractive power.

The second lens unit LE2 is likewise composed of several lenses, namely a fourth lens L4, a fifth lens L5, a sixth lens L6, a seventh lens L7 and an eighth lens L8. The fourth lens L4 forms a first lens group LG21, which has positive refractive power. By contrast, the lenses L5 to L8 form a second lens group LG22, which likewise has positive refractive power.

The third lens unit LE3 is likewise composed of several lenses, namely a ninth lens L9, a tenth lens L10, an eleventh lens L11, a twelfth lens L12 and a thirteenth lens L13. Lenses L9 to L13 form a third lens group LG31, which has negative refractive power.

The fourth lens unit LE4 comprises a fourteenth lens L14 and a fifteenth lens L15. The fourth lens unit LE4 has positive refractive power.

Each of the aforementioned lenses L1 to L15 has a first surface directed at the object O and a second surface directed at the image acquisition unit BE. These are characterized in FIG. 6.

Thus, the first lens L1 has a surface 2 directed at the object O and a surface 3 directed at the image acquisition unit BE. The second lens L2 is provided with a surface 4 directed at the object O and with a surface 5 directed at the image acquisition unit BE. The third lens L3 likewise has the surface 5 (now directed at the object O) and a surface 6 directed at the image acquisition unit BE. The fourth lens L4 is provided with a surface 8 directed at the object O and with a surface 9 directed at the image acquisition unit BE. The fifth lens L5 has a surface 10 directed at the object O and a surface 11 directed at the image acquisition unit BE. The sixth lens L6 likewise has a surface 12 directed at the object O and a surface 13 directed at the image acquisition unit BE. The seventh lens L7 likewise has the surface 13 (now directed at the object O) and a surface 14 directed at the image acquisition unit BE. By contrast, the eighth lens L8 has a surface 15 directed at the object O and a surface 16 directed at the image acquisition unit BE.

The ninth lens L9 has a surface 18 directed at the object O and a surface 19 directed at the image acquisition unit BE. By contrast, the tenth lens L10 has a surface 20 directed at the object O and a surface 21 directed at the image acquisition unit BE. The eleventh lens L11 in turn has the surface 21 directed at the object O and a surface 22 directed at the image acquisition unit BE. The twelfth lens L12 has a surface 24 directed at the object O and is furthermore provided with a surface 25 directed at the image acquisition unit BE. The thirteenth lens L13 likewise has the surface 25 (now directed at the object O) and a surface 26 directed at the image acquisition unit BE. The fourteenth lens L14 in turn has a surface 27 directed at the object O and a surface 28 directed at the image acquisition unit BE. The fifteenth lens L15 likewise has the surface 28 (now directed at the object O) and a surface 29 directed at the image acquisition unit BE.

Properties of the individual lens surfaces are specified in a table below.

TABLE 3

| Surface | Radius [mm] | Thickness [mm] | Glass |
|---|---|---|---|
| 0 | Infinity | 0.000000 | |
| 1 | Infinity | 1.000000 | |
| 2 (A) | 193.432769 | 4.000119 | SBAL35 |
| 3 | 37.994704 | 22.277583 | |
| 4 | −185.453058 | 3.500000 | SBSM25 |
| 5 | 51.507538 | 7.540737 | NLASF46A |
| 6 | 148.323543 | 3.029450 | |
| 7 | 758.678817 | 65.487802 | |
| 8 | 167.785290 | 9.059492 | SFPL51 |
| 9 | −76.152545 | 6.923106 | |
| 10 | −45.756005 | 6.499237 | NKZFS5 |
| 11 | −95.586309 | 2.054568 | |
| 12 | 539.788967 | 2.499248 | NKZFS5 |
| 13 | 77.673974 | 13.251587 | NBK10 |
| 14 | −55.984453 | 0.244664 | |
| 15 | 75.226559 | 5.621770 | SFPL51 |
| 16 | −756.010331 | 3.999919 | |
| 17 | Stop | 0.000000 | |
| 18 (A) | 23.182484 | 4.229823 | SNBH5 |
| 19 | 40.000002 | 2.240014 | |

TABLE 3-continued

| Surface | Radius [mm] | Thickness [mm] | Glass |
|---|---|---|---|
| 20 | 189.333206 | 4.646475 | STIH1 |
| 21 | −39.882226 | 2.498069 | SLAH64 |
| 22 | 32.719558 | 3.912052 | |
| 23 | Infinity | 1.666025 | |
| 24 | 122.396793 | 2.498325 | SLAH79 |
| 25 | 21.606192 | 5.977393 | SFPL51 |
| 26 | −48.744175 | 1.236753 | |
| 27 | −73.640279 | 2.488203 | NKZFS11 |
| 28 | 47.177670 | 6.836341 | SLAH58 |
| 29 | −67.817999 | 47.724742 | |
| 30 | Infinity | | |

The individual surfaces of the individual lenses L1 to L15 emerge from the table above. The radii of the individual surfaces are also specified. Moreover, the distance of the vertex of one surface to the vertex of the next surface is specified. This also reproduces the thickness of the individual lenses L1 to L15. The type of glass of the respective units is also specified, with the notation of the glass types relating to glass types from Schott and Ohara.

The surfaces 1, 7 and 23 are not illustrated in FIGS. 4 to 6. These are auxiliary surfaces, which were used to calculate the data contained in Table 3. The surfaces 1, 7 and 23 are not physically realized in the objective 100.

The surface 17 denotes a stop B (cf. FIG. 4). The stop B is also (as a peculiarity of the zoom-objectives of this system described herein) mechanically coupled to a movable negative lens group. In this exemplary embodiment, this coupling also has an advantageous effect on the diameters of the individual units and therefore leads to small diameters of the individual units.

In Table 3, the surface 0 denotes the object O. The surface 30 denotes the surface of the image acquisition unit BE.

Surfaces of individual lenses have an aspherical design. These surfaces are marked by an "A", with the aspherical design emerging from the equation with the associated aspherical coefficients, as already mentioned above:

For the surface 2, the following coefficients apply:
k=0.000000
$A_4$=6.53811706187772E-07
$A_6$=−9.70551495647618E-13
$A_8$=4.18641337730801E-14
$A_{10}$=−5.19122723064601E-17
$A_{12}$=2.11358531075844E-20

For the surface 18, the following coefficients apply:
k=0.000000
$A_4$=8.33215813833185E-07
$A_6$=2.81846789604375E-09
$A_8$=1.67286959756972E-11
$A_{10}$=−5.57532626418691E-14
$A_{12}$=2.71874072113721E-16

The following table specifies the focal lengths, the F-number and the distance of the specified surfaces to the next surface in the focal length settings illustrated in FIGS. 4 to 6.

TABLE 4

| Setting | f[mm] | F-number | Distance 7 [mm] | Distance 9 [mm] | Distance 16 [mm] | Distance 26 [mm] |
|---|---|---|---|---|---|---|
| FIG. 4 | 28.800 | 2.88 | 65.488 | 6.923 | 4.000 | 1.237 |
| FIG. 5 | 54.499 | 3.00 | 19.579 | 15.196 | 25.463 | 17.410 |
| FIG. 6 | 77.600 | 2.88 | 4.455 | 2.476 | 43.794 | 26.922 |

The following now applies to both the exemplary embodiment according to FIGS. 1 to 3 and to the exemplary embodiment according to FIGS. 4 to 6.

The first lens unit LE1 comprises a fourth lens group LG11 and a fifth lens group LG12. From the object O, the fourth lens group LG11 is arranged first, followed by the fifth lens group LG12 in the direction of the image acquisition unit BE. The fifth lens group LG12 has negative refractive power and is moved for focusing the objective 100 onto the object O.

The second lens unit LE2 consists of at least one lens group with positive refractive power, which is moved for adjusting the focal length of the objective 100. In the exemplary embodiment as per FIGS. 1 to 3, the second lens unit LE2 consists of a lens group LG21, which is formed from the four lenses L5 to L8. By contrast, in the exemplary embodiment as per FIGS. 4 to 6, the second lens unit LE2 comprises the two lens groups LG21 and LG22 (first lens group LG21 and second lens group LG22) which can move for adjusting the focal length and which both have positive refractive power.

Both exemplary embodiments respectively have the third lens group (LG31 or LG32) in the third lens unit LE3. It is likewise moved during the zoom procedure (adjusting the focal length).

In order to set the focal length of the objective 100, the movable lens groups of the second lens unit LE2 and the third lens unit LE3 are moved along the optical axis of the objective 100.

By moving the lens groups within these two lens units LE2 and LE3, the focal length is adjusted continuously and constantly. The first lens unit LE1 and the fourth lens unit LE4 are not moved for adjusting the focal length of the objective 100.

The second lens unit LE2 has a (second) linear magnification $\beta_2$. Furthermore, the third lens unit LE3 has a (third) linear magnification $\beta_3$. In order to set the first focal length (FIG. 1, FIG. 4), the lens groups of the second lens unit LE2 and the third lens unit LE3 are brought into the positions illustrated in FIG. 1 or FIG. 4. In order to set the second focal length (FIG. 2, FIG. 5), the lens groups of the second lens unit LE2 and the third lens unit LE3 are brought into the positions illustrated in FIG. 2 or FIG. 5. In order to set the third focal length (FIG. 3, FIG. 6), the lens groups of the second lens unit LE2 and the third lens unit LE3 are brought into the positions illustrated in FIG. 3 or FIG. 6. The objective 100 satisfies the following relation:

$$|\beta_{2W}\beta_{3W}|\% < |\beta_{2M}\beta_{3M}| < |\beta_{2T}\beta_{3T}|$$ [Relation 1]

wherein $\beta_{2W}$ is the linear magnification of the second lens unit LE2 in the first focal length setting, $\beta_{3W}$ is the linear magnification of the third lens unit LE3 in the first focal length setting, $\beta_{2M}$ is the linear magnification of the second lens unit LE2 in the second focal length setting, $\beta_{3M}$ is the linear magnification of the third lens unit LE3 in the second focal length setting, $\beta_{2T}$ is the linear magnification of the second lens unit LE2 in the third focal length setting and $\beta_{3T}$ is the linear magnification of the third lens unit LE3 in the third focal length setting.

In the first exemplary embodiment as per FIGS. 1 to 3, the absolute value of the product of the linear magnification of the second lens unit LE2 and the linear magnification of the third lens unit LE3 changes continuously in a range from 1.41 to 4.21, wherein the specified limits of the range belong to the range. However, reference is explicitly made to the fact that the system described herein is not restricted to the aforementioned range. Rather, any range that is suitable for the system described herein can be used.

In the second exemplary embodiment as per FIGS. 4 to 6, the absolute value of the product of the linear magnification of the second lens unit LE2 and the linear magnification of the third lens unit LE3 changes from 0.98 to 2.64. However, provision is for example also made in the objective 100 for the absolute value of the product of the linear magnification of the second lens unit LE2 and the linear magnification of the third lens unit LE3 to lie in the range from 0.9 to 5. The aforementioned limits of the ranges belong to the ranges claimed. However, reference is explicitly made to the fact that the system described herein is not restricted to the aforementioned ranges. Rather, any range that is suitable for the system described herein can be used.

In a variation of the exemplary embodiment in FIGS. 4 to 6, provision is made for the focal length of the second lens unit LE2 to be 60.77 mm. By contrast, the focal length of the third lens unit LE3 is −114.89 mm. The linear magnification of the second lens unit LE2 lies in the range from −0.57 to −1.36. The linear magnification of the third lens unit LE3 lies in the range from 1.72 to 1.94.

In both exemplary embodiments, the linear magnification of the second lens unit LE2 can lie between −0.5 and −2 and the linear magnification of the third lens unit LE3 can lie between 1.5 and 3.

When adjusting the focal length of the objective 100, the stop B is moved together with the lens group LG31 with negative refractive power within the third lens unit LE3. In other words, in order to adjust the focal length of the objective 100, the stop B has a movable design together with the lens group with negative refractive power within the third lens unit LE3. The stop B furthermore comprises an aperture. The aperture of the stop B can be set when adjusting the focal length of the objective 100. In particular, provision is made for an extent of the aperture to lie in the range from 20 mm to 35 mm.

The first lens unit LE1 has a lens with positive refractive power in both exemplary embodiments, wherein this lens can be designed both as single lens as in the exemplary embodiment in accordance with FIGS. 1 to 3 and as a lens within a cemented element as in the exemplary embodiment in accordance with FIGS. 4 to 6.

The exemplary embodiments discussed here have all the advantages that were already discussed further above. Reference is explicitly made to these explanations.

Various embodiments discussed herein may be combined with each other in appropriate combinations in connection with the system described herein. Additionally, in some instances, the order of steps in the flowcharts, flow diagrams and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with other computers and/or with a user. Software implementations of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An optical system for imaging an object on an image acquisition unit, comprising:
   at least a first lens unit, at least a second lens unit, at least a third lens unit and at least a fourth lens unit, as seen in the direction of the image acquisition unit from an object,
   wherein the optical system has an adjustable focal length,
   wherein the first lens unit and the fourth lens unit have an unmovable design when adjusting the focal length of the optical system,
   wherein the second lens unit and the third lens unit overall comprise at least three lens groups that include a first lens group, a second lens group and a third lens group,
   wherein, from the first lens unit in the direction of an image acquisition unit, the first lens group is arranged first, followed by the second lens group and then the third lens group,
   wherein the first lens group, the second lens group and the third lens group have a movable design for adjusting the focal length of the optical system,
   wherein at least one of the first lens group, the second lens group and the third lens group has positive refractive power and at least one of the first lens group, the second lens group and the third lens group has negative refractive power, and
   wherein the second lens unit has a linear magnification which can be adjusted between −0.4 and −2 when adjusting the focal length.

2. The optical system according to claim 1, wherein the third lens unit has a positive linear magnification which can be adjusted between 1.5 and 3 when adjusting the focal length.

3. The optical system according to claim 1,
   wherein the second lens unit comprises the first lens group and the second lens group, and
   wherein the first lens group and the second lens group have positive refractive power.

4. The optical system according to claim 1, wherein the third lens unit comprises the third lens group.

5. The optical system according to claim 1,
   wherein the first lens group has a linear magnification,
   wherein the second lens group has a linear magnification, and
   wherein the linear magnification of the first lens group and the linear magnification of the second lens group change sign at the same time when adjusting the focal length.

6. The optical system according to claim 1,
   wherein the first lens unit comprises at least two lens groups, that include a fourth lens group and a fifth lens group,
   wherein the fourth lens group is arranged first from the object in the direction of the image acquisition unit, followed by the fifth lens group,
   wherein the fourth lens group has negative refractive power,
   wherein the fifth lens group has negative refractive power,
   wherein the fifth lens group has an unmovable design when adjusting the focal length of the optical system, and
   wherein the fifth lens group has a movable design for focusing the optical system.

7. The optical system according to claim 1, wherein both the absolute value of the linear magnification of the second lens unit and the absolute value of the linear magnification of the third lens unit increase continuously when adjusting the focal length of the optical system from the first focal length setting to the second focal length setting.

8. The optical system according to claim 1, wherein the product of the linear magnification of the second lens unit and the linear magnification of the third lens unit in terms of absolute value lies in the range of 0.9 to 5.0.

9. The optical system according to claim 1, wherein the optical system satisfies the following condition:

$$|\beta_{2W}\beta_{3W}|<|\beta_{2M}\beta_{3M}|<|\beta_{2T}\beta_{3T}|$$

wherein
   $\beta_{2W}$ is the linear magnification of the second lens unit in a first focal length setting,
   $\beta_{3W}$ is the linear magnification of the third lens unit in the first focal length setting,
   $\beta_{2M}$ is the linear magnification of the second lens unit in a second focal length setting,
   $\beta_{3M}$ is the linear magnification of the third lens unit in the second focal length setting,
   $\beta_{2T}$ is the linear magnification of the second lens unit in a third focal length setting and
   $\beta_{3T}$ is the linear magnification of the third lens unit in the third focal length setting.

10. The optical system according to claim 1, further comprising:
    a stop arranged on or in the third lens unit, wherein the stop has a movable design together with or within the third lens unit in order to adjust the focal length of the optical system.

11. The optical system according to claim 1, wherein at least one of the following features applies:
    (i) the first lens unit has at least one first aspherical surface;
    (ii) the second lens unit has at least one second aspherical surface; or
    (iii) the third lens unit has at least one third aspherical surface.

12. The optical system according to claim 1,
    wherein the positive refractive power within the second lens unit refers to a focal length which lies in the range between 40 mm and 70 mm, and
    wherein the negative refractive power within the third lens unit refers to a focal length which lies in the range between −40 mm and −120 mm.

13. The optical system according to claim 1, wherein the optical system is an objective.

14. A recording unit for imaging an object, comprising:
    at least one image acquisition unit; and
    at least one optical system for imaging the object on the image acquisition unit, the at least one optical system including:
    at least a first lens unit, at least a second lens unit, at least a third lens unit and at least a fourth lens unit, as seen in the direction of the image acquisition unit from the object,
    wherein the optical system has an adjustable focal length,
    wherein the first lens unit and the fourth lens unit have an unmovable design when adjusting the focal length of the optical system, wherein the second lens unit and the third lens unit overall comprise at least three lens groups that include a first lens group, a second lens group and a third lens group, wherein, from the first lens unit in the direction of an image acquisition unit, the first lens group is arranged first, followed by the second lens group and then the third lens group, wherein the first lens group, the second lens group and the third lens group have a movable design for adjusting the focal length of the optical system, wherein at least one of the first lens group, the second lens group and the third lens group has positive refractive power and at least one of the first lens group, the second lens group and the third lens group has negative refractive power, wherein the at least one optical system is an objective, and wherein the second lens unit has a linear magnification which can be adjusted between −0.4 and −2 when adjusting the focal length.

15. An optical system for imaging an object on an image acquisition unit, comprising:

at least a first lens unit, at least a second lens unit, at least a third lens unit and at least a fourth lens unit, as seen in the direction of the image acquisition unit from an object, wherein the optical system has an adjustable focal length, wherein the first lens unit and the fourth lens unit have an unmovable design when adjusting the focal length of the optical system, wherein the second lens unit and the third lens unit overall comprise at least three lens groups that include a first lens group, a second lens group and a third lens group, wherein, from the first lens unit in the direction of an image acquisition unit, the first lens group is arranged first, followed by the second lens group and then the third lens group, wherein the first lens group, the second lens group and the third lens group have a movable design for adjusting the focal length of the optical system, wherein at least one of the first lens group, the second lens group and the third lens group has positive refractive power and at least one of the first lens group, the second lens group and the third lens group has negative refractive power, and wherein the third lens unit has a positive linear magnification which can be adjusted between 1.5 and 3 when adjusting the focal length.

16. The optical system according to claim 15, wherein the second lens unit comprises the first lens group and the second lens group, and wherein the first lens group and the second lens group have positive refractive power.

17. The optical system according to claim 15, wherein the third lens unit comprises the third lens group.

18. The optical system according to claim 15, wherein the first lens group has a linear magnification, wherein the second lens group has a linear magnification, and wherein the linear magnification of the first lens group and the linear magnification of the second lens group change sign at the same time when adjusting the focal length.

19. The optical system according to claim 15, wherein the first lens unit comprises at least two lens groups, including a fourth lens group and a fifth lens group, wherein the fourth lens group is arranged first from the object in the direction of the image acquisition unit, followed by the fifth lens group, wherein the fourth lens group has negative refractive power, wherein the fifth lens group has negative refractive power, wherein the fifth lens group has an unmovable design when adjusting the focal length of the optical system, and wherein the fifth lens group has a movable design for focusing the optical system.

20. The optical system according to claim 15, wherein both the absolute value of the linear magnification of the second lens unit and the absolute value of the linear magnification of the third lens unit increase continuously when adjusting the focal length of the optical system from the first focal length setting to the second focal length setting.

21. The optical system according to claim 15, wherein the product of the linear magnification of the second lens unit and the linear magnification of the third lens unit in terms of absolute value lies in the range of 0.9 to 5.0.

22. The optical system according to claim 15, wherein the optical system satisfies the following condition;

$$|\beta_{2W}\beta_{3W}| < |\beta_{2M}\beta_{3M}| < |\beta_{2T}\beta_{3T}|$$

wherein $\beta_{2W}$ is the linear magnification of the second lens unit in a first focal length setting, $\beta_{3W}$ is the linear magnification of the third lens unit in the first focal length setting, $\beta_{2M}$ is the linear magnification of the second lens unit in a second focal length setting, $\beta_{3M}$ is the linear magnification of the third lens unit in the second focal length setting, $\beta_{2T}$ is the linear magnification of the second lens unit in a third focal length setting and $\beta_{3T}$ is the linear magnification of the third lens unit in the third focal length setting.

23. The optical system according to claim 15, further comprising:

a stop arranged on or in the third lens unit, wherein the stop has a movable design together with or within the third lens unit in order to adjust the focal length of the optical system.

24. The optical system according to claim 15, wherein at least one of the following features applies:

(i) the first lens unit has at least one first aspherical surface;

(ii) the second lens unit has at least one second aspherical surface; or (iii) the third lens unit has at least one third aspherical surface.

25. The optical system according to claim 15, wherein the positive refractive power within the second lens unit refers to a focal length which lies in the range between 40 mm and 70 mm, and wherein the negative refractive power within the third lens unit refers to a focal length which lies in the range between −40 mm and −120 mm.

26. The optical system according to claim 15, wherein the optical system is an objective.

27. A recording unit for imaging an object, comprising:

at least one image acquisition unit; and at least one optical system for imaging the object on the image acquisition unit, the at least one optical system including:

at least a first lens unit, at least a second lens unit, at least a third lens unit and at least a fourth lens unit, as seen in the direction of the image acquisition unit from the object, wherein the optical system has an adjustable focal length, wherein the first lens unit and the fourth lens unit have an unmovable design when adjusting the focal length of the optical system, wherein the second lens unit and the third lens unit overall comprise at least three lens groups that include a first lens group, a second lens group and a third lens group, wherein, from the first lens unit in the direction of an image acquisition unit, the first lens group is arranged first, followed by the second lens group and then the third lens group, wherein the first lens group, the second lens group and the third lens group have a movable design for adjusting the focal length of the optical system, wherein at least one of the first lens group, the second lens group and the third lens group has positive refractive power and at least one of the first lens group, the second lens group and the third lens group has negative refractive power, wherein the at least one optical system is an objective, and wherein the third lens unit has a positive linear magnification which can be adjusted between 1.5 and 3 when adjusting the focal length.

\* \* \* \* \*